United States Patent Office 3,767,830
Patented Oct. 23, 1973

3,767,830
GLAZE FROSTING MIXES
George R. Reimer, Minneapolis, Minn., assignor to
General Mills, Inc.
No Drawing. Filed Sept. 22, 1971, Ser. No. 182,824
Int. Cl. A23g 3/00
U.S. Cl. 426—162                    10 Claims

ABSTRACT OF THE DISCLOSURE

A glossy glaze topping dry mix including sugar, shortening and pregelatinized starch. When rehydrated, the glaze rapidly dries to texture of a dry touch surface and a moist substratum.

---

This invention relates to pour-on, glossy glaze topping, dry mix. More particularly, this invention relates to a pour-on, glossy glaze dry mix which is shelf stable, readily rehydratable, substantially nonlumping, hand mixable and requires no cooking.

By glossy glaze is meant a pour-on, noncooked, nonaerated, sugar base, fat containing glaze topping which, when applied to confections, develops a dry-to-the- touch surface and a moist substratum. The compositions of this invention can be readily used by the consumer by merely rehydrating the dry mix, pouring the rehydrated glaze over the confection and smoothing it as desired. The resulting glaze has a high sheen, a smooth texture and substantially no lumps. Traditionally the objective of using glazes has been to decorate a confection rather than making a substantial flavor contribution.

Cooked glazes are generally made from scratch using sugar, water, milk and corn syrup. These glazes are smooth in texture and have a high sheen. Dry mixes for cooked glazes are generally made by merely combining sugar, dry corn syrup and dry milk. The dry mixes for cooked glazes presently available lack tolerance to preparation variables such as different water levels, cooking temperatures and cooking periods. The glazes obtained from the dry mix compositions of the present invention differ from the cooked glazes prepared from scratch in that they require no cooking procedure, thereby avoiding the problems of cooking variables and the time involved in cooking, and are of equal or better quality. These differences are also found when comparing the glazes made from the dry mix compositions of the present invention with cooked glazes made from dry mixes. Heretofore, dry mixes for making uncooked glazes have produced rehydrated glazes which had dull surface sheen, grainy textures, lumps and do not drizzle well. The glazes made from the dry mix compositions of the present invention differ from uncooked glazes made from presently available dry mixes in that: the surface has a high sheen; the texture is smooth having a dry-to-the-touch surface and an underlying moist stratum; there are substantially no lumps; the glaze can easily be poured onto the confection and dried thereon; and the flow properties can be so controlled as to provide either a sheet flow or a finger forming or drizzle effect.

The dry mix composition of this invention comprises:
About 70% to 92% sucrose by weight of the composition,
About 2% to 5% shortening by weight of the composition, said shortening having a Solid-Fat Index in the range of about

| Temperature, ° F. | SFI, percent |
|---|---|
| 50 | 26–60 |
| 70 | 19–36 |
| 80 | 5–24 |
| 92 | 3–15 |
| 104 | 2–11 | and a Wiley Melting Point in the range of about 96° F. to 114° F., and
About 0.5% to 4% pregelatinized starch by weight of the composition.

In order to promote smoother textures in the final rehydrated glazes, it is preferred that the particle size of the sucrose be such as to pass through about a #200 U.S. Sieve. When sucrose having this particle size is used in commerce, it is common practice to include in the commercial commodity a raw wheat starch to maintain the free flowing quality of the commodity. The raw wheat starch is usually included in amounts of from about 2% to 6% by weight of the sucrose. The presence of the raw starch in the sucrose component plays no part in the present invention. With the sucrose component it is preferred to include a dry corn starch hydrolyzate in amounts up to about 20% by weight of the composition. The incorporation of corn starch hydrolyzates into the dry mix composition contributes to the glossy appearance and sheen of the surface of the glaze. Suitable corn starch hydrolyzates include dry corn syrup and dry maltodextrin. The most preferred embodiments of this invention include a corn starch hydrolyzate or mixtures of corn starch hydrolyzates in amounts of from about 5% to 15% by weight of the composition.

The shortening component contributes to the mouth-feel, gloss, texture and drying time of the glaze. The shortening can be of animal or vegetable origin. Preferably it is unemulsified. The dry mix compositions of this invention can tolerate emulsifiers to some extent; however, important features of these dry mix compositions are their capability of absorbing water to form homogeneous, pourable mixtures for purposes of pouring the glaze onto the bakery item, maintaining an appropriate water level to form decorative drizzle effects or sheet effects as desired before drying, and dispersing the water to form a dry glaze. It can be readily appreciated that emulsification levels which disturb the interaction of the dry mix composition with water will detract from the desirable features of the glaze. The Solid-Fat Index is defined as the percentage of weight of solid fat to fluid fat at a given temperature. Shortenings having the Solid-Fat Index set out above can be used in the practice of the present invention. Generally, if the shortening is of vegetable origin, it is necessary to hydrogenate it to obtain the desired Solid-Fat Index. The shortening used in the dry mix compositions of the present invention should have low solid fat levels at mouth temperature. On the other hand, in order to maintain, through storage, the capacity of the dry mix to interact with water in the unique manner described above, it has been found that shortenings having a minimum Solid-Fat Index of about 19% at about 70° F. are preferred. A shortening found to be particularly useful in making the dry mix compositions of this invention was edible beef tallow containing some rearranged lard and tallow flakes. The Solid-Fat Index of this shortening was

| Temperature, ° F.: | SFI, percent |
|---|---|
| 50 | 29–33 |
| 70 | 21–24 |
| 80 | 19–22 |
| 92 | 14–17 |
| 104 | 8–10 | and its Wiley Melting Point was 110° F. to 112° F.

Another shortening which is useful in the practice of this invention is a refined hydrogenated coconut oil having a Solid-Fat Index of

| Temperature, ° F.: | SFI, percent |
|---|---|
| 50 | 54–60 |
| 70 | 30–36 |
| 80 | 5–11 |
| 92 | 3–5 | and a Wiley Melting Point of 98° F. to 102° F.

The shortening is generally used in amounts of about 2% to 5% by weight of the dry mix composition and preferably in amounts of about 2% to 4% by weight of the dry mix composition. Best results in respect to shelf life were obtained when the shortening particles were a size of less than 1% by weight on a #50 mesh screen.

The pregelatinized starch is generally used in amounts of from about 0.5% to 4% by weight of the dry mix composition and preferably in amounts of from about 2% to 3% by weight of the dry mix composition. It is preferred that the particle size distribution of the pregelatinized starch be such as to pass through a #100 U.S. Sieve and 75% to 100% by weight passes through a #200 U.S. Sieve thus minimizing the possibility of graininess developing in the final product. Pregelatinized starches useful in the practice of this invention include tuber starches such as tapioca and cereal starches such as corn and wheat starch.

In one preferred embodiment of the invention, anhydrous calcium sulfate in amounts of about 0.4% to 1.5% by weight of the dry mix composition is included to supplement the moisture regulating capacity of the pregelatinized starch. The anhydrous calcium sulfate contributes to decreasing the drying time of the glaze and producing a high sheen to the surface. In another preferred embodiment of the invention, carrageenan gums are included to produce finger forming or drizzling effects when the glaze spreads and reduce the drying time of the glaze. The finger forming or stringing out of the glaze can be achieved by including a carrageenan gum in amounts of from about 0.1 to 0.5% by weight of the dry mix composition. By finger forming or drizzling is meant that when the glaze runs down the sides of a cake or other confection, it forms fingers of drizzles rather than a solid sheet. A carrageenan gum which produces the finger forming or stringing out of the glaze is sold under the trade name Seakem® 402 by Marine Colloids, Inc. This gum is composed primarily of sulfated d-galactose and some 3,6-anhydro-d-galactose residues, linked together to form long chain polymers having molecular weights of several hundred thousand. Ester sulfate groups, characteristic of carrageenan gums in general, represent about 25% by weight of the gum. In the most preferred embodiment of the invention, calcium carrageenan is included. Calcium carrageenan gums control the extent of finger forming and stringing out or drizzling of the glaze. It also adds strength to the fingers or drizzled portions and reduces breakage of the glaze during the finger forming or drizzling period. Calcium carrageenan is generally used in amounts of about 0.25% to 1% by weight of the dry mix composition. A calcium carrageenan gum suitable for use in the present invention is sold under the trade name Seakem® DC calcium carrageenan by Marine Colloids, Inc. This is a refined water soluble calcium carrageenan and is primarily composed of both 3,6-anhydro-d-galactose and sulfated d-galactose residues linked together to form long chain polymers having molecular weights of several hundred thousand. The ester sulfate groups are approximately 25% by weight of the product.

A carrageenan gum and a calcium carrageenan are generally used together to produce a given finger forming or drizzling effect. When carrageenan gum and calcium carrageenan gum are included in the dry mix composition and the dry mix is prepared by the preferred process, the time required for drying the glaze is less than about six minutes when the relative humidity is about 25% to 50% and the confection is at room temperature.

The dry mix compositions of this invention are preferably made using the following procedure.

The sucrose is chilled in a ribbon blender. To achieve chilling, the blender and the ingredients can be cooled with liquid carbon dioxide to adjust the temperature of the ingredients to about 30° to 50° F. and preferably 35° to 40° F. The shortening is blended into the mixture of sucrose, coloring and flavoring. Best results are obtained if the shortening is super-cooled, worked and tempered prior to introduction into the sucrose. The blending of the shortening and sucrose is done in a ribbon blender having high speed chopping blades interspered between ribbon sections. The ribbon sections mix, blend and feed the mixture against and through the chopping blades. The chopping blades are operated at about 3000 to 4000 r.p.m. and preferably at about 3400 to 3800 r.p.m. Because of the violent action of the chopper blades, considerable heat is created and the temperature of the sucrose rises. Blending of the shortening into the sugar is usually continued until the lump count is less than 1% by weight on a U.S. #20 screen as measured by the Alpine Test Method. The Alphine is a vacuum screening device used to test materials granulation. The screens used are U.S. Standard opening sieves mounted on eight inch diameter brass drums that fit on top of the Alpine housing. A rotating sweep arm beneath the screen blows air up through the screen to agitate the material being tested. An overall suction provided by an auxiliary industrial vacuum cleaner pulls fine material through the screen and out to the bag collector. A Plexiglass cover resting on the brass drum provides a seal for the vacuum.

The temperature of the mixture after such blending should be below about 85° F. and is usually about 70° to 75° F. The pregelatinized starch, corn starch hydrolyzates, gums, calcium sulfate and salt are blended into the mixture after the proper dispersion of the shortening throughout the sucrose has been achieved. The blending of these ingredients is generally but not necessarily conducted without a chopping action. After ribbon blending, the mixture is finished in a commercial finisher to reduce the number of lumps in the final dry mix composition. Good results are obtained from dry mix compositions in which the final lump count is a trace to 1% by weight on a U.S. #50 Standard Sieve using the Alpine Test Method. The temperature of the mixture after finishing should be below about 85° F. and is usually about 75° to 85° F.

Coloring and flavoring can be introduced into the composition with the sucrose-shortening blending or with the pregelatinized starch. The consumer can use the dry mix compositions of this invention by blending the dry mix compositions with about 20% to 30% water by weight of the dry mix composition, the water having a temperature above about 180° F. For best results, a two step rehydration procedure is used. In this procedure, about two-thirds of the water to be added is mixed with the glaze. After mixing is completed, the remaining one-third of the water is mixed into the glaze. This method reduced the possibility of any lumping occurring. The rehydrated glaze is then poured or dipped onto the confection. The time required for the glaze to dry is dependent upon: the temperature of the confection glazed, the temperature of the water used with the topping dry mix, the type of confection glazed, the moisture level of the composition glazed, the relative humidity, whether or not carrageenan gums were included in the glaze dry mix, and whether the glaze was poured or dipped onto the confection. When the preferred embodiments of the invention are used, the drying time is approximately five minutes under most conditions. The glaze will spread or can be smoothed over the confection. If carrageenan gum was included, the glaze will run vertically downward in fingers; otherwise, it will run vertically downward in sheets.

Production experience has shown that when the components other than the shortening are premixed and the shortening is then blended into the premix using substantially the same conditions as set out above, dry mixes are obtained which require about twenty minutes to dry, have much duller surfaces and are softer to the touch. It has been hypothesized that when mixed in this manner, more shortening is smeared onto the pregelatinized starch, gums and anhydrous calcium sulfate thus inhibiting their ability to interact with the water. Microscopic examination, however, showed no visible difference in the distribution of the shortening between the mixes which dry within five or six minutes to a high sheen and dry-to-the-touch surface and moist substratum and those which dry in about twenty minutes to a dull sheen and are soft.

In order to better illustrate the invention, specific examples are shown below to illustrate preferred embodiments of the invention and the effect of variables in the composition upon the characteristics of the glossy glaze. One of the methods used for measuring differences in glossy glaze characteristics is the Bostwick viscosity measurement. The Bostwick viscometer has a calibrated cup for holding a sample, a movable trap on the side of the cup, and a calibrated trough leading from the cup at the point the trap is located on the cup. The sample is placed in the cup, the trap opened and the sample runs out into the trough. The measurement is expressed in Bostwick units, which are distance units marked on the trough per time required by the sample to move any given number of units. As a matter of standardizing results, the method calls for mixing the glaze in a kitchen mixer on slow speed for a period of about five minutes and holding the glaze in the cup for a period of about one minute. Because the manipulation times will vary somewhat, the overall limitation is that the trap on the Bostwick viscometer will be opened exactly six minutes from the time mixing of the glaze was begun. This method of measuring spreadability is well adapted to characterizing topping, syrups and glazes.

EXAMPLE I

This example illustrates the simplest form of the invention. A glossy glaze dry mix composition was made having the following formulation:

|  | Percentage by weight of dry mix |
|---|---|
| Sucrose (granulation 2% by weight on #230 U.S. Standard Sieve and containing 4% raw wheat starch) | 83.80 |
| Dried corn syrup (D.E. 34–48%, granulation 1% on U.S. #100 Standard Sieve, American Maize Co.) | 10.00 |
| Plastic shortening [1] | 3.55 |
| Pregelatinized tapioca starch (Redisol #4, A. E. Staley Co.) | 2.35 |
| Salt, fine flour grind | 0.25 |
| Flavoring, vanilla | 0.15 |
|  | 100.00 |

[1] The shortening was an edible beef tallow containing some rearranged lard and tallow flakes. The Solid-Fat Index was:

| Temperature, F.: | SFI, percent |
|---|---|
| 50° | 29–33 |
| 70° | 21–24 |
| 80° | 19–22 |
| 92° | 14–17 |
| 104° | 8–10 | and the Wiley Melting Point was 110° F. to 112° F.

The dry mix composition was manufactured by placing the sucrose and flavoring in a ribbon blender. The blender and ingredients were cooled with liquid carbon dioxide. The blending was conducted for a period of about five minutes. At the end of this period the temperature of the sucrose and flavoring was about 35° to 40° F.

The shortening was melted in a surge tank at a temperature of from 125° to 130° F. The melted shortening was allowed to cool to about 110° to 120° F. The melted shortening was then passed through a scraped surface heat exchanger, in this case a votator. The votator rapidly chilled the melted shortening to supercooled temperatures, about 68° to 72° F. In unit A of the votator the shortening was cooled to a temperature of about 65° to 70° F. Chilling was done in about 10 to 25 seconds. The shortening was then moved into what is called a working unit. In a votator system it is designated the B unit. The working unit includes an unrefrigerated cylinder which keeps the supercooled shortening under mild agitation during solidification. The shortening was in the working unit for a period of about 10 to 25 seconds and the temperature of the shortening at the outlet was about 68° to 72° F. After emerging from the heat exchanger, the shortening was allowed to rest for at least 20 minutes. It was then extruded into the chilled mixture of sucrose and coloring in the ribbon blender. At the point of extrusion the temperature of the shortening was about 80° to 85° F. Blending of the sucrose, coloring and shortening in a ribbon blender equipped with chopping blades rotating at 3600 r.p.m. required about 15 minutes. The lump count of the resulting mixture was less than 1% on a U.S. #20 Standard Sieve using the Alpine Test Method. The pregelatinized tapioca starch, dry corn syrup and salt were then added to the sucrose, shortening, coloring mixture and blended in a ribbon blender not using chopping blades until a homogeneous mixture was obtained. The blending period was about five minutes and the final temperature was less than about 75° F. The mixture was then passed through a finisher operating with seven blades at a speed of 2900 r.p.m. The final lump count was less than 1% on a U.S. #50 Standard Sieve using the Alpine Test Method. The temperature of the dry mix composition immediately after finishing was about 80° to 85° F.

The dry mix composition was rehydrated by adding 30 ml. of water having a temperature between about 180° to 212° F. to 184 grams of the dry mix composition, mixing and then adding another 15 ml. of water at approximately the same temperature. The temperature of the water in this example and all subsequent examples is expressed in a range. In actual handling, a quantity of water is brought to a boil and about 30 to 45 ml. of water is removed from this quantity and added to the glaze dry mix. Because of the small volume involved, cooling during handling is very rapid and temperatures generally can only be approximated. The resulting glossy glaze was pourable and when poured onto a cake and allowed to run down the sides, formed a sheet of glaze. The glossy glaze dried in about 30 minutes at a relative humidity of 25% to 50%. Spreading measurements were made using the Bostwick viscometer described above. The glaze spread at a rate of 24 Bostwick units in two minutes fifteen seconds.

EXAMPLE II

This example illustrates the use of pregelatinized starches in addition to pregelatinized tapioca starch. Samples having the formulations shown below were made by the process set out in Example I.

| Ingredients | Percentage by weight of the mixture of Sample— | | |
|---|---|---|---|
| | I | II | III |
| Sucrose (granulation 2% by weight on a U.S. #230 Standard Sieve and containing 4% wheat starch) | 83.62 | 83.62 | 83.62 |
| Dried corn syrup (D.E. 34–48%, granulation 1% on U.S. #100 Standard Sieve, American Maize Co.) | 10.25 | 10.25 | 10.25 |
| Plastic shortening* | 3.46 | 3.46 | 3.46 |
| Pregelatinized tapioca starch (Redisol #4, A. E. Staley Co.) | 2.42 | | |
| Pregelatinized waxy maize starch (American Maize Co.) | | 2.42 | |
| Pregelatinized wheat starch | | | 2.42 |
| Salt, fine flour grind | 0.25 | 0.25 | 0.25 |
| Total | 100.00 | 100.00 | 100.00 |

*See footnote, Example I.

The glaze dry mix samples were rehydrated according to the procedure set out in Example I. The flow characteristics were defined by the Bostwick method set out above. Table I shows a comparison of the flow characteristics in Bostwick units of the three samples.

TABLE 1

| | Bostwick units after 30 seconds | Time (sec.) to reach 24 Bostwick units |
|---|---|---|
| Sample I | 20.5 | 63 |
| Sample II | 18.75 | 140 |
| Sample III | 21.25 | 60 |

All of the samples dried within five minutes and had a good sheen.

EXAMPLE III

This example illustrates the effect of adding calcium sulfate to the dry mix composition. A dry mix composition was made having the following formulation:

| | Percentage by weight of dry mix |
|---|---|
| Sucrose (granulation 2% by weight on a #230 U.S. Standard Sieve and containing 4% raw wheat starch) | 83.13 |
| Dried corn syrup (D.E. 34–48%, granulation 1% on U.S. #100 Standard Sieve, American Maize Co.) | 10.00 |
| Plastic shortening [1] | 3.55 |
| Pregelatinized tapioca starch (Redisol #4, A. E. Staley Co.) | 2.35 |
| Anhydrous calcium sulfate | 0.62 |
| Salt, fine flour grind | 0.20 |
| Flavoring | 0.15 |
| | 100.00 |

[1] See footnote, Example I.

The dry mix composition was made by the method set out in Example I. The anhydrous calcium sulfate was added with the pregelatinized tapioca starch.

The dry mix composition was rehydrated by adding 45 ml. of water having a temperature of about 180° to 212° F. to 184 grams of the dry mix composition. The resulting glaze was pourable and when poured onto a cake and allowed to run down the sides, formed a sheet of glaze. The glaze had a higher sheen than the glaze described in Example I. Spreading measurements were made as described above. The glaze spread at a rate of 22.9 Bostwick units in four minutes and fifteen seconds. The glaze was substantially dry in about ten minutes at a relative humidity of 25% to 50%.

EXAMPLE IV

This example illustrates the effect of adding calcium carrageenan to the dry mix composition. A dry mix composition having the following formulation was made:

| | Percent by weight of dry mix |
|---|---|
| Sucrose (granulation 2% by weight on a #230 U.S. Standard Sieve and containing 4% raw wheat starch) | 83.25 |
| Dried corn syrup (D.E. 34–48%, granulation 1% on a U.S. #100 Standard Sieve, American Maize Co.) | 10.00 |
| Plastic shortening [1] | 3.55 |
| Pregelatinized tapioca starch (Redisol #4, A. E. Staley Co.) | 2.35 |
| Calcium carrageenan (Seakem® DC, Marine Colloids, Inc.) | 0.50 |
| Salt, fine flour grind | 0.20 |
| Flavoring | 0.15 |
| | 100.00 |

[1] See footnote, Example I.

The dry mix composition was manufactured according to the procedure set out in Example I. The calcium carrageenan was added with the pregelatinized starch. The dry mix composition was rehydrated with 45 ml. of water having a temperature of about 180° to 212° F. to 184 grams of the dry mix composition. The glaze had a higher gloss than the glaze of Example I or II. It was pourable and when poured onto a cake ran down the sides in a sheet. The spreadability of the glaze was measured on a Bostwick viscometer according to the procedure set out above. The glaze spread at a rate of 18.1 Bostwick units in three minutes and fifteen seconds. The glaze dried in less than five minutes. It was more resistant to breakage than the glazes in Examples I and II.

EXAMPLE V

This example illustrates the effect of carrageenan gum to the dry mix composition. A dry mix composition was made having the following composition:

| | Percentage by weight of dry mix |
|---|---|
| Sucrose (granulation 2% by weight on a U.S. #230 Standard Sieve containing 4% raw wheat starch) | 83.55 |
| Dried corn syrup (D.S. 34–48%, granulation 1% on U.S. #100 Standard Sieve, American Maize Co.) | 10.00 |
| Plastic shortening [1] | 3.55 |
| Pregelatinized tapioca starch (Redisol #4, A. E. Staley Co.) | 2.35 |
| Salt, fine flour grind | 0.20 |
| Carrageenan gum (Seakem® 402, Marine Colloids, Inc.) | 0.20 |
| Flavoring | 0.15 |
| | 100.00 |

[1] See footnote, Example I.

The dry mix composition was manufactured according to the procedure set out in Example I. The carrageenan gum was added with the pregelatinized tapioca starch. The dry mix composition was rehydrated with 45 ml. of water having a temperature of about 180° to 212° F. to 184 grams of the dry mix composition.

The glaze was pourable and stringy. When poured over a cake, the glaze ran down the sides of the cake in fingers. The fingers were fairly easily broken. The spreadability of the glaze was measured on a Bostwick viscometer according to the procedure set out above. The glaze spread at the rate of about 20 Bostwick units in three minutes and fifteen seconds. The glaze dried in less than five minutes.

EXAMPLE VI

This example illustrates the use of a shortening having the following Solid-Fat Index.

| Temperature, ° F.: | SFI, percent |
|---|---|
| 50 | 54–60 |
| 70 | 30–36 |
| 80 | 5–11 |
| 92 | 3–5 |

This shortening is a hydrogenated vegetable oil having a Wiley Melting Point of 98° to 102° F.

Using the shortening described above, a dry mix composition was manufactured having the following formulation:

| | Percentage by weight of dry mix |
|---|---|
| Sucrose (granulation 2% by weight on a U.S. #230 Standard Sieve containing 4% wheat starch) | 82.38 |
| Dried corn syrup (D.E. 34–48%, granulation 1% on U.S. #100 Standard Sieve, American Maize Co.) | 10.00 |
| Plastic shortening [1] | 3.55 |
| Pregelatinized tapioca starch (Redisol #4, A. E. Staley Co.) | 2.35 |
| Anhydrous calcium sulfate | 0.62 |
| Calcium carrageenan (Seakem® DC, Marine Colloids, Inc.) | 0.50 |
| Salt, fine flour grind | 0.20 |
| Carrageenan gum (Seakem® 402, Marine Colloids, Inc.) | 0.20 |
| Flavoring | 0.15 |
| | 100.00 |

[1] See footnote, Example I.

The dry mix composition was manufactured according to the procedure described in Example I with the following exceptions. The shortening was not melted and passed through a scraped surface heat exchanger but used as stored at room temperature. The anhydrous calcium sulfate and gums were added with the pregelatinized tapioca starch. The dry mix composition was rehydrated with 45 ml. of water having a temperature of about 180° to 212° F. to 184 grams of the dry mix composition. When dipped or poured onto a cake and allowed to run down the sides, the rehydrated glaze forms fingers or drizzles which are resistant to breakage by handling of the cake. The glaze had a high sheen although slightly duller than commonly obtained with the shortening used in Example I. The rehydrated glaze had no lumps.

EXAMPLE VII

This example illustrates two preferred embodiments of the invention differing only in adjustments for flavoring ingredients.

Glaze A contains a vanilla flavoring and has the following composition:

| | Percentage by weight of dry mix |
|---|---|
| Sucrose (granulation 2% by weight on a U.S. #230 Standard Sieve and containing 4% raw wheat starch) | 82.38 |
| Dried corn syrup (D.E. 34–48%, granulation 1% on U.S. #100 Standard Sieve, American Maize Co.) | 10.00 |
| Plastic shortening [1] | 3.55 |
| Pregelatinized tapioca starch (Redisol #4, A. E. Staley Co.) | 2.35 |
| Anhydrous calcium sulfate | 0.62 |
| Salt, fine flour grind | 0.25 |
| Calcium carrageenan | 0.50 |
| Carrageenan gum | 0.20 |
| Flavor, butter vanilla | 0.15 |
| | 100.00 |

[1] See footnote, Example I.

Glaze B contains a cocoa flavoring and has the following composition:

| | Percentage by weight of dry mix |
|---|---|
| Sucrose (granulation 2% by weight on a U.S. #230 Standard Sieve and containing 4% raw wheat starch) | 78.88 |
| Dried corn syrup (D.E. 34–48%, granulation 1% on U.S. #100 Standard Sieve, American Maize Co.) | 10.00 |
| Cocoa, red dutched (10–12% cocoa fat) | 5.00 |
| Plastic shortening [1] | 3.55 |
| Pregelatinized tapioca starch (Redisol #4, A. E. Staley Co.) | 1.00 |
| Calcium sulfate | 0.62 |
| Calcium carrageenan (Seakem® DC, Marine Colloids, Inc.) | 0.50 |
| Salt, fine flour grind | 0.25 |
| Carrageenan gum (Seakem® 402, Marine Colloids, Inc.) | 0.20 |
| | 100.00 |

[1] See footnote, Example I.

The dry mix compositions were manufactured by the procedure set out in Example I. The anhydrous calcium sulfate and gums were added with the pregelatinized tapioca starch. The dry mix compositions were rehydrated with 45 ml. of water having a temperature of about 180° to 212° F. to 184 grams of the dry mix composition. The above formulations when rehydrated have a spreadability of about 16 Bostwick units in a period of three minutes. When dipped or poured onto a cake and allowed to run down the sides, the rehydrated glazes form fingers or drizzles which are resistant to breakage by handling of the cake. The glaze has a very high sheen. Finally, these glazes dry in less than five minutes at relative humidities of 25% to 50%.

I claim:

1. A glaze dry mix composition comprising
   about 70% to 92% sucrose by weight of the composition,
   about 2% to 5% shortening by weight of the composition, said shortening having a Solid-Fat Index in the range of about

| Temperature, ° F. | SFI, percent |
   |---|---|
   | 50 | 26–60 |
   | 70 | 19–36 |
   | 80 | 5–24 |
   | 92 | 3–15 |
   | 105 | 2–11 | and a Wiley Melting Point in the range of about 96° F. to 114° F., and
   about 0.5% to 4% pregelatinized starch by weight of the composition, and dried corn starch hydrolyzate in amounts sufficient to contribute a glossy appearance and sheen to the final product.

2. The dry mix of claim 1 wherein up to about 20% dried corn starch hydrolyzate by weight of the composition is included.

3. The dry mix of claim 2 wherein a corn starch hydrolyzate is included in amounts of from about 5% to 15% by weight of the composition.

4. The dry mix of claim 1 wherein the pregelatinized starch is included in amounts of about 2% to 4% by weight of the composition.

5. The dry mix of claim 1 wherein carrageenan gum in amounts of from 0.1 to 0.50% by weight of the composition is included.

6. The dry mix of claim 5 wherein a calcium carrageenan in amounts of about 0.25% to 1% by weight of the dry mix composition is included.

7. The dry mix of claim 1 wherein anhydrous calcium sulfate in amounts of about 0.4% to 1.5% by weight of the composition is included.

8. A glaze dry mix composition comprising
about 70% to 92% sucrose by weight of the composition,
about 2% to 4% shortening by weight of the composition, said shortening having a Solid-Fat Index in the range of about

| Temperature, °F.: | SFI, percent |
|---|---|
| 50 | 26–60 |
| 70 | 19–36 |
| 80 | 5–24 |
| 92 | 3–15 |
| 104 | 2–11 | and a Wiley Melting Point in the range of about 96° F. to 114° F., and
about 0.5% to 4% pregelatinized starch by weight of the composition,
about 5% to 15% dried corn starch hydrolyzate by weight of the composition,
about 0.4% to 1.5% anhydrous calcium sulfate by weight of the composition,
about 0.1% to 0.5% carrageenan gum by weight of the composition, and
about 0.25% to 1% calcium carrageenan by weight of the composition.

9. A process for making a glaze dry mix composition comprising
about 70% to 92% sucrose by weight of the composition,
about 2% to 5% shortening by weight of the composition said shortening having a Solid-Fat Index in the range of about

| Temperature, °F.: | SFI, percent |
|---|---|
| 50 | 26–60 |
| 70 | 19–36 |
| 80 | 5–24 |
| 92 | 3–15 |
| 104 | 2–11 | and a Wiley Melting Point in the range of about 96° F. to 114° F., and
about 0.5% to 4% pregelatinized starch by weight of the composition,
said process comprising:
chilling the sucrose component to a temperature of about 30° F. to 50° F.,
supercooling, working and tempering the shortening,
blending and chopping the shortening into sucrose while maintaining the temperature of the mixture below about 85° F.,
blending the pregelatinized starch into the sucrose-shortening mixture while maintaining the temperature of the mixture below about 85° F., and
finishing the resulting mixture while maintaining the temperature of the mixture below about 85° F.

10. A process for making a glaze dry mix composition comprising
about 70% to 92% sucrose by weight of the composition,
about 2% to 4% shortening by weight of the composition, said shortening having a Solid-Fat Index in the range of about

| Temperature, °F.: | SFI, percent |
|---|---|
| 50 | 26–60 |
| 70 | 19–36 |
| 80 | 5–24 |
| 92 | 3–15 |
| 104 | 2–11 | and a Wiley Melting Point in the range of about 96° F. to 114° F., and
about 0.5% to 4% pregelatinized starch by weight of the composition,
about 5% to 15% dried corn starch hydrolyzate by weight of the composition,
about 0.4% to 1.5% anhydrous calcium sulfate by weight of the composition,
about 0.1% to 0.5% carrageenan gum by weight of the composition, and
about 0.25% to 1% calcium carrageenan by weight of the composition,
said process comprising:
chilling the sucrose component to a temperature of about 35° F. to 40° F.,
supercooling, working and tempering the shortening,
blending and chopping the shortening into the sucrose while maintaining the temperature of the mixture below about 85° F.,
blending the pregelatinized starch, corn starch hydrolyzate, anhydrous calcium sulfate, carrageenan gum and calcium carrageenan into the sucrose-shortening mixture while maintaining the temperature of the mixture below about 85° F.,
finishing the resulting mixture while maintaining the temperature of the mixture below about 85° F.

References Cited
UNITED STATES PATENTS

| | | | |
|---|---|---|---|
| 3,088,829 | 5/1963 | Rapaport | 99—139 |
| 3,244,536 | 4/1966 | Kidger | 99—139 |
| 3,343,965 | 9/1967 | Gass | 99—139 |

ALVIN E. TANENHOLTZ, Primary Examiner

J. M. HUNTER, Assistant Examiner

U.S. Cl. X.R.
426—291, 380